(12) United States Patent
Stouder-Studenmund

(10) Patent No.: US 11,392,308 B2
(45) Date of Patent: Jul. 19, 2022

(54) TECHNIQUES FOR IMPLEMENTING USER SPACE FILE SYSTEMS

(71) Applicant: Apple Inc., Cupertino, CA (US)

(72) Inventor: William R. Stouder-Studenmund, Bonita, CA (US)

(73) Assignee: Apple Inc.

( * ) Notice: Subject to any disclaimer, the term of this patent is extended or adjusted under 35 U.S.C. 154(b) by 419 days.

(21) Appl. No.: 16/417,097

(22) Filed: May 20, 2019

(65) Prior Publication Data

US 2020/0372187 A1 Nov. 26, 2020

(51) Int. Cl.
*G06F 3/06* (2006.01)
*G06F 13/28* (2006.01)

(52) U.S. Cl.
CPC .......... *G06F 3/0647* (2013.01); *G06F 3/0604* (2013.01); *G06F 3/0622* (2013.01); *G06F 3/0656* (2013.01); *G06F 3/0673* (2013.01); *G06F 13/28* (2013.01)

(58) Field of Classification Search
CPC .... G06F 3/0647; G06F 3/0604; G06F 3/0622; G06F 3/0656; G06F 3/0673; G06F 13/28
See application file for complete search history.

(56) References Cited

U.S. PATENT DOCUMENTS

| | | | | |
|---|---|---|---|---|
| 2008/0183908 A1* | 7/2008 | Slater | ...................... | G06F 9/544 710/11 |
| 2009/0282198 A1* | 11/2009 | Hamoudi | .............. | G06F 12/084 711/147 |
| 2012/0242671 A1* | 9/2012 | Wyatt | .................... | G09G 5/001 345/520 |
| 2015/0331607 A1* | 11/2015 | McCarthy | ............... | G06F 3/061 711/103 |
| 2016/0291887 A1* | 10/2016 | Gole | ........................ | G06F 3/068 |
| 2017/0153987 A1* | 6/2017 | Gaonkar | ............. | G06F 12/1009 |
| 2019/0102287 A1* | 4/2019 | Cayton | ..................... | G06F 3/06 |
| 2020/0310665 A1* | 10/2020 | Hansen | ................. | G06F 3/0673 |

OTHER PUBLICATIONS

Operating System CS111 Lecture 4 (Oct. 7, 2008) by Gene Auyeung, Yanshu Fan, Albert Hsieh, Matt Schuerman (Year: 2008).*

* cited by examiner

*Primary Examiner* — Nanci N Wong
(74) *Attorney, Agent, or Firm* — Dickinson Wright RLLP

(57) ABSTRACT

This application relates to a technique that enables data transfer between an untrusted entity and a storage of a computing device. The technique can include the steps of (1) receiving, from a buffer cache, a pointer referencing a storage location; (2) creating a first abstract reference object based on the pointer, the first abstract reference object including a value; (3) generating a buffer object that provides access to the storage location; (4) sharing access to the buffer object with a first process, where: (i) the first process includes a first reference table, and (ii) the first abstract reference object is inserted into the first reference table; (5) creating a service request that includes the first abstract reference object; (6) transmitting the service request to the first process over a messaging protocol; and (7) initializing the buffer object by associating the value of the first abstract reference object with the buffer object.

20 Claims, 12 Drawing Sheets

Step 3 – Create Service Request: File system client shares access to the shared mutable buffer object with file provider daemon by inserting a reference in a table of file provider daemon.

TECHNIQUES FOR IMPLEMENTING USER SPACE FILE SYSTEMS

FIELD OF INVENTION

The described embodiments relate generally to providing access to a storage of a computing device. More particularly, the present embodiments relate to techniques for enabling untrusted software applications to securely read or write into the storage of the computing device.

BACKGROUND

Recent years have shown a proliferation in the average number and types of computing devices and storage solutions that are used by individuals. For example, an individual can own various computing devices, including a laptop device, a tablet device, a smartphone device, a wearable device (e.g., a fitness tracker), and so on. As is well-known, various solutions exist for storing data, including storage devices that are internal to computing devices (e.g., native/included in original configurations), storage devices that are external to computing devices (e.g., remote, removable, and the like), and storage devices associated with storage services (e.g., cloud storage) that are accessible to computing devices.

In most cases, a given computing device implements a file system that stores data on an internal storage device. Unfortunately, the overall ease of access to the data can be hindered by a desire for security and privacy. For example, when an untrusted entity (e.g., an untrusted device or software) is connected to the computing device, the untrusted entity typically has little to no access to the file system implemented on the device, thus reducing overall operational flexibility. Such restrictions are typically intended given that untrusted entities are of unknown provenance and quality—and, in some cases, can be riddled with bugs or malicious code. Consequently, the goal of implementing a computing device with robust security can directly conflict with enabling the computing device to securely exchange data with other entities.

Different solutions exist that attempt to address both security concerns as well as ease of access. For example, when a given computing device requests access to a file stored on an untrusted external device (e.g., a memory card, a flash drive, a storage device, and the like), one solution includes copying the file from the external device through various processes executing on the computing device and storing the file locally on the computing device (i.e., checking the file out). In some scenarios, a modified version of the file can be saved back onto the untrusted external device (i.e., checking the file back in). Unfortunately, these methods can be cumbersome when the data being copied is large in size. Moreover, these methods can fail when the data being copied is larger than the disk space available on the computing device. In this scenario, the computing device cannot copy over the data, and, consequently, the computing device cannot access the data at all. In this regard, users are faced with the difficult choice of sacrificing overall security in the interest of gaining operational flexibility.

SUMMARY

Representative embodiments set forth herein disclose techniques for enabling untrusted entities (e.g., software and other devices) to access a storage of a computing device.

According to some embodiments, a method is disclosed for enabling data transfer between an untrusted entity and a main storage of a computing device. The method can be implemented at a computing device, and include the steps of (1) receiving, from a buffer cache, a pointer referencing a storage location; (2) creating a first abstract reference object based on the pointer, the first abstract reference object comprising a value; (3) in response to receiving the pointer, generating a buffer object that provides access to the storage location; (4) sharing access to the buffer object with a first process, where: (i) the first process includes a first reference table, and (ii) the first abstract reference object is inserted into the first reference table; (5) creating a service request that includes the first abstract reference object; (6) transmitting the service request to the first process over a messaging protocol; and (7) initializing the buffer object by associating the value of the first abstract reference object with the buffer object.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, where like reference numerals designate like structural elements.

DETAILED DESCRIPTION

Representative applications of methods and an apparatus according to the presently described embodiments are provided in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

The embodiments set forth techniques for enabling untrusted entities—e.g., untrusted software—to, when permitted, securely access a storage of a computing device. The untrusted software can be associated with a storage device (e.g., a hard drive, a flash memory device, and the like) that is communicably coupled with the computing device, a storage service (e.g., a cloud-based service) that provides storage space and is communicably coupled with the computing device, a file server, and so on. According to some embodiments, a first process (e.g., a file system client) executing on the computing device can create a shared mutable buffer that provides access to pages in the storage of the computing device. Access to the shared mutable buffer can subsequently be provided by way of one or more abstract references to the shared mutable buffer. In particular, respective abstract references can be generated and provided to different entities seeking to access the storage. In turn, and upon receiving a read or write request, the entities can utilize their respective abstract references to access the shared mutable buffer to directly read from or write into the storage.

A more detailed description of these techniques is set forth below and described in conjunction with FIGS. 1, 2A-2F, 3A-3D, and 4, which illustrate detailed diagrams of systems and methods that can be used to implement these techniques.

Figure 1:
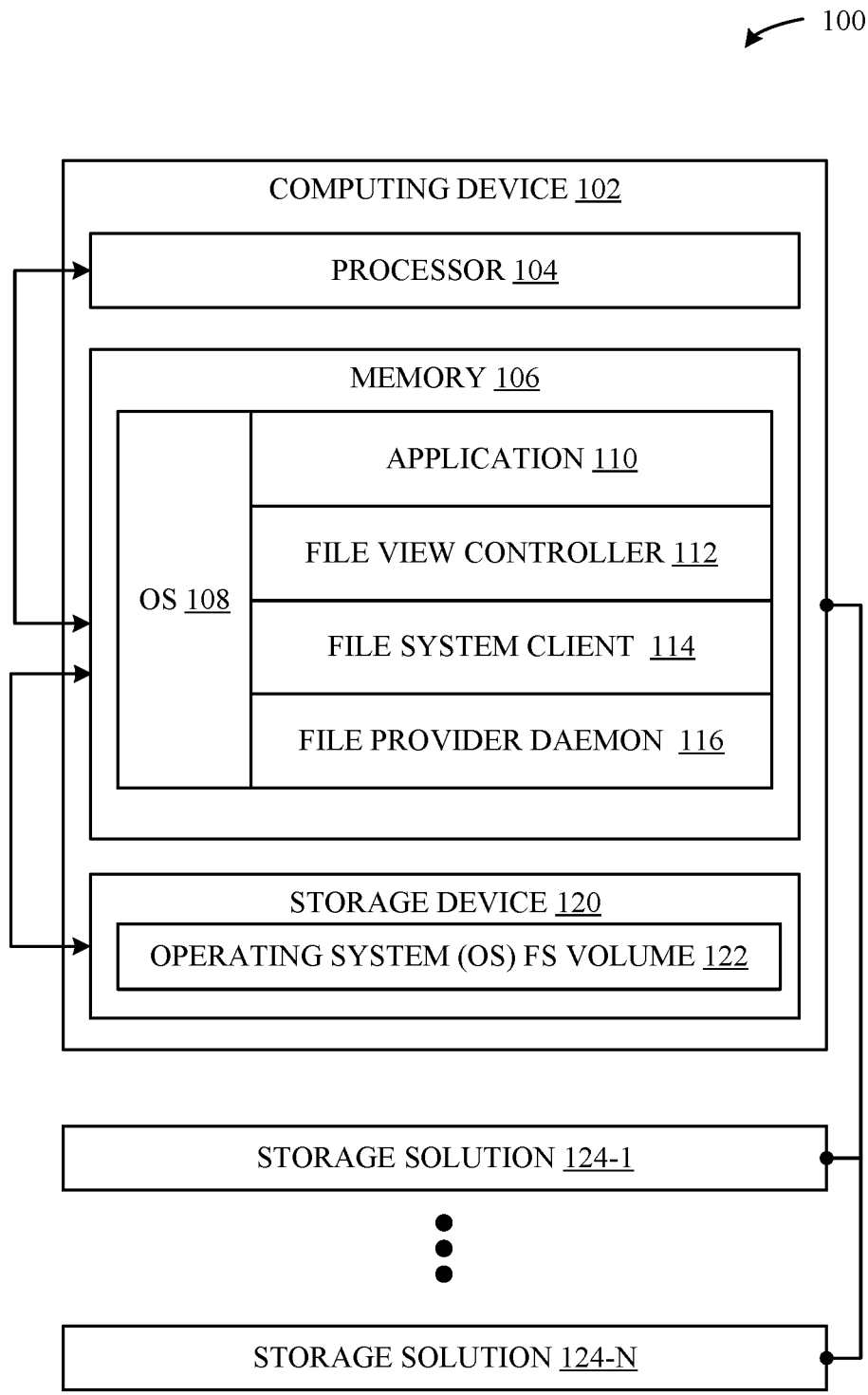
FIG. 1 illustrates a block diagram of different computing devices that can be configured to implement different aspects of the various techniques described herein, according to some embodiments.

FIG. 1 illustrates a block diagram 100 of a computing device 102 that can be configured to implement various aspects of the techniques described herein. Specifically, FIG. 1 illustrates a high-level overview of the computing device 102, which, as shown, can include at least one processor 104, at least one memory 106, and at least one storage device 120. According to some embodiments, the computing device 102 can represent any form of a computing device, e.g., a personal computing device, a smartphone, a tablet, a desktop computing device, a rack-mounted computing device, and so on. It is noted that the foregoing examples are not meant to be limiting. On the contrary, the computing device 102 can represent any form of a computing device without departing from the scope of this disclosure.

According to some embodiments, the processor 104 can be configured to operate in conjunction with the memory 106 and the storage device 120, to enable the computing device 102 to implement the various techniques set forth in this disclosure. According to some embodiments, the storage device 120 can represent a storage device that is accessible to the computing device 102, e.g., a hard drive, a solid-state drive (SSD), a mass storage device, a remote storage device, and the like. In some embodiments, the storage device 120 can be a storage device internal to the computing device 102. According to some embodiments, the storage device 120 can be configured to store an operating system (OS) file system volume 122 that can be mounted at the computing device 102, where the OS file system volume 122 includes an OS 108 that is compatible with the computing device 102. According to some embodiments, the OS 108, the OS file system volume 122, and the storage device 120 represent entities that are trusted within the computing device 102.

It is noted that trusted entities can include software that is native to the OS 108, software that originates from a trusted source, and the like. In particular, a trusted entity is one which a user has reason to believe originates from a trusted source and thus presents minimal risks of causing harm to the computing device 102. As an example, trusted software can be confirmed through the use of signed certificates between the trusted software and the OS 108. In contrast, untrusted entities can be of unknown origin, or from sources other than the source that created the OS 108. Untrusted entities are of unknown provenance and quality, and in some cases, can be riddled with bugs or malicious code. In this regard, untrusted software can be restricted from accessing the storage device 120 and the OS file system volume 122.

According to some embodiments, and as shown in FIG. 1, the OS 108 can enable a variety of processes to execute on the computing device 102, e.g., OS daemons, native OS applications, user applications, and the like. For example, the application 110 illustrated in FIG. 1 can represent an application that is native to the OS 108 (e.g., a photo application, a mail application, a contacts application, and the like). As the application 110 is native to the OS 108, the application 110 constitutes trusted software and thus the application 110 can access files within the OS file system volume 122 without restriction. The OS 108 can also enable the execution of a file view controller 112 that can represent a file browser that is capable of generating user interfaces. For example, the file view controller 112 can generate a user interface that is actively presented to a user on a display device (not shown in FIG. 1) communicably coupled to the computing device 102. In this manner, the file view controller 112 can present one or more files for selection by a user through the user interface. The file view controller 112 also constitutes trusted software.

As shown in FIG. 1, the OS 108 can also enable the execution of a file system client 114 that functions as an interface between the OS file system volume 122 and a file provider daemon 116. The file system client 114 constitutes trusted software, and, in particular, the file system client 114 can provide access to the OS file system volume 122 to both trusted and untrusted entities. According to some embodiments—and, as described in greater detail herein—the file system client 114 can generate a shared mutable buffer that provides access to pages of memory within the storage device 120 including the OS file system volume 122. According to some embodiments, the file system client 114 can generate the shared mutable buffer in conjunction with receiving information about storage locations within the storage device 120 and the OS file system volume 122. Subsequently, the file system client 114 can provide the shared mutable buffer to applications that are untrusted entities, which might otherwise be restricted from accessing the storage device 120.

According to some embodiments, the file system client 114 initially provides the shared mutable buffer to the file provider daemon 116, which also constitutes trusted software. The file provider daemon 116 subsequently provides the shared mutable buffer to the applications that might otherwise be restricted from accessing the storage device 120—and, more specifically, the OS file system volume 122. It is noted that the term "daemon" used herein can refer to any software, thread, or process. A non-limiting example of a daemon is a process or program that runs as a background process and that can wait for events or times to perform operations.

According to some embodiments, and as shown in FIG. 1, various storage solutions 124 can be communicably coupled to the computing device 102. For example, a respective storage solution 124 can be communicably coupled to the computing device 102 through any combination of wired and wireless connections including, e.g., Ethernet®, WiFi®, code division multiple access (CDMA), global system for mobile (GSM), and so on. It is noted that the foregoing example methods of communication are not meant to represent an exhaustive list. On the contrary, communicative coupling between the computing device 102 and a given storage solution 124 can take any form without departing from the scope of this disclosure.

In some embodiments, the storage solutions 124 can represent untrusted entities including untrusted devices executing untrusted software. The untrusted devices can include any type of storage device used to store data—e.g., a hard drive, a flash memory device, a memory card such as a camera card, a solid-state drive, and the like. Furthermore, the untrusted device of a given storage solution 124, can represent a storage device associated with a storage service that provides storage space (e.g., a cloud-based service). For example, a user can use the computing device 102 to access data stored in the cloud-based service. Furthermore, a given storage solution 124 can represent a storage device located within another computing device (e.g., a storage device in a laptop computer, a storage device in a smartphone, and the like). For example, a user can use the computing device 102 to access pictures stored on a storage device within a tablet. Thus, a given storage solution 124 can be part of a computing device that includes one or more processors, one or more memories, and so on.

It is noted that the foregoing example storage solutions 124 are not meant to represent an exhaustive list in any manner. On the contrary, the storage solutions 124 can represent any form of a storage device without departing from the scope of this disclosure. As an additional example, a given storage solution 124 can represent a rack-mounted storage device. As described further below, the file system client 114 and the file provider daemon 116 allow the computing device 102 to securely exchange data with a given storage solution 124, which can represent an untrusted entity, by providing the shared mutable buffer to the untrusted entity that might otherwise be restricted from accessing the storage device 120 and the OS file system volume 122.

Accordingly, FIG. 1 sets forth a high-level overview of the different components that can be included in the computing device 102 that enable the embodiments described herein to be properly implemented. These components can be utilized in a variety of ways to enable the computing device 102 to provide access to the OS file system volume 122 in a controlled and secure manner to both trusted and untrusted entities. Next, FIGS. 2A-2F, and 3A-3D—which are described in greater detail below—set forth example conceptual and method diagrams in which the file system client 114 processes a request (e.g., a read or write request) and provides access to the storage device 120 and the OS file system volume 122 in a secure manner to untrusted entities.

Figure 2A:
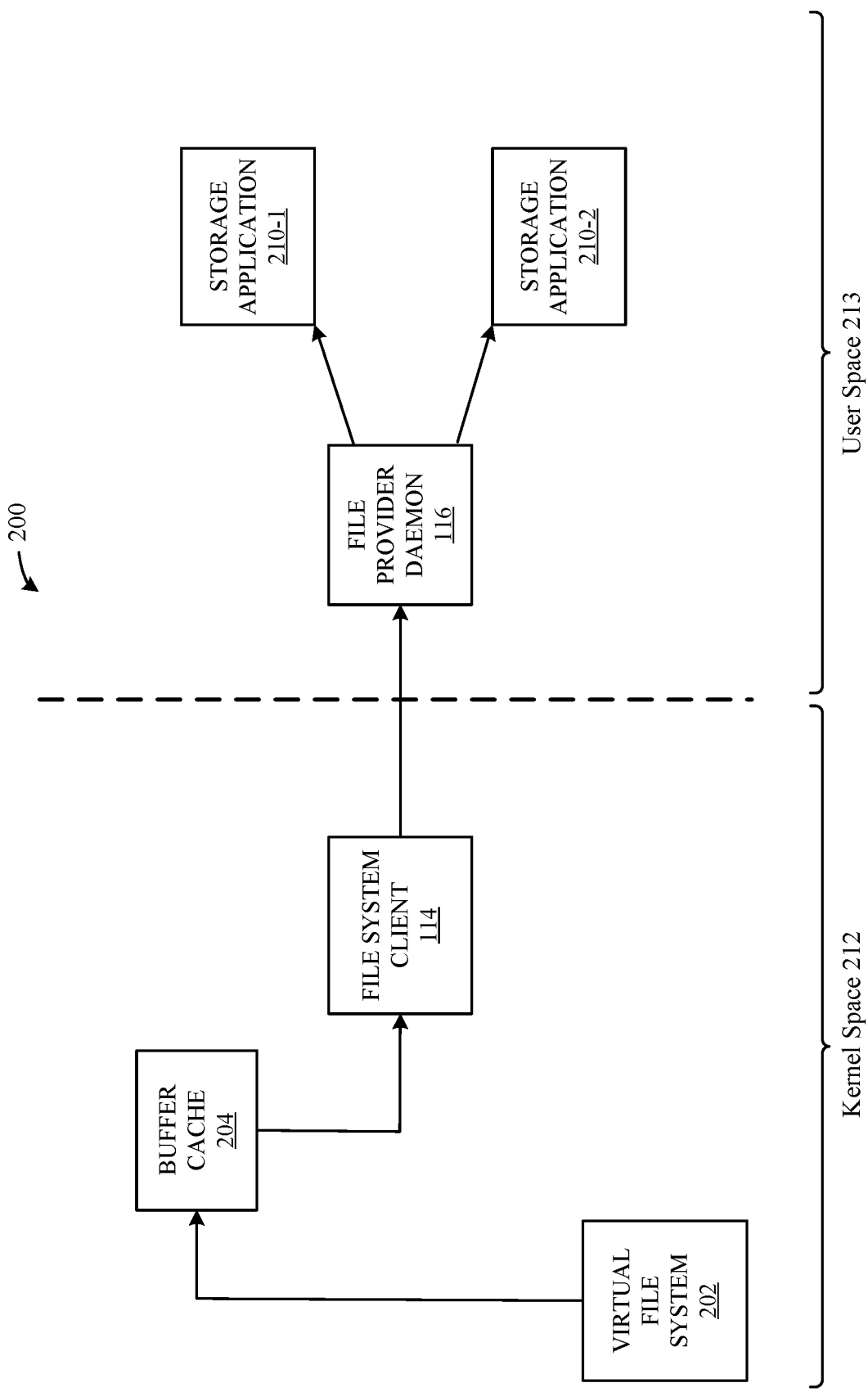
FIGS. 2A-2F illustrate conceptual and method diagrams in which a file system client provides access to storage with a file provider daemon, according to some embodiments.

FIGS. 2A-2F illustrate conceptual and method diagrams that demonstrate a technique in which the file system client 114 can generate a shared mutable buffer, where the shared mutable buffer provides access to pages of memory within the storage device 120 (including the OS file system volume 122), according to some embodiments. Initially, an example block diagram 200, as shown in FIG. 2A, illustrates an example initial architecture that can be implemented within the computing device 102. As shown in FIG. 2A, an operating space of the computing device 102 can be divided into a kernel space 212 and a user space 213. Dividing the operating space in such a manner can enable the computing device 102 to protect against storage access by malicious software. According to some embodiments, the kernel space 212 can represent an area where kernel processes can execute, while the user space 213 can represent an area where user processes can execute.

According to some embodiments, the user space 213 can provide a form of sandboxing that enables the computing device 102 to restrict a program executing in the user space 213 from accessing storage and other resources owned by the operating system or its kernels (executing in the kernel space 212). Thus, the computing device 102 has the ability to limit the amount of access provided to resources executing within the kernel space 212. It should be noted that the various terms derived from the term "sandbox" used herein are not meant to be limiting. For example, a sandboxed mode can include, but is not limited to, any general security mechanism that can create a restrictive computing environment for one or more components executing within the computing device 102.

According to some embodiments, and as shown in FIG. 2A, a virtual file system 202, a buffer cache 204, and the file system client 114 (introduced in FIG. 1) can execute within the kernel space 212. The virtual file system 202 can represent a general-purpose layer executing within the kernel space 212 that handles all file operation requests from various processes (e.g., the application 110). According to some embodiments, the virtual file system 202 is communicably coupled to the buffer cache 204 that, in turn, is communicably coupled to the file system client 114. According to some embodiments, the buffer cache 204 can act as a buffer between applications executing on the computing device 102 and the storage device 120. The buffer cache 204 can help relieve data throughput bottlenecks that can be created by a relatively slow storage device 120.

As also shown in FIG. 2A, the file provider daemon 116 (introduced in FIG. 1) and one or more storage applications 210 can execute within the user space 213. According to some embodiments, the storage applications 210 can represent processes—i.e., applications—that are associated with a respective storage solution 124 (discussed in FIG. 1). According to some embodiments, a given storage application 210 can represent untrusted software. For example, the storage application 210-1 can be associated with a given storage service (e.g., a cloud-based service) where the storage application 210-1 can access data stored by the storage service. In this example, the storage application 210-1 can operates as a daemon that functions as an interface between a process executing on the computing device 102 and the storage service. For example, when a process executing on the computing device 102 requests to read a file stored by the storage service, the process can transmit a read request to the storage application 210-1. In turn, the storage application 210-1 can respond by retrieving the file and delivering the file to the process.

As another example, a storage application 210-2 can be associated with a storage device. The storage device can be either internal or external to the computing device 102 and can include a hard disk drive, a memory card, a storage device of another computer device, and the like. The storage application 210-2 can function as an interface between various processes—i.e., the application 110 executing on the computing device 102—and the storage device associated with the storage application 210-2. It is noted that the two storage applications 210 shown in FIG. 2A are not meant to be a limiting example of the computer software architecture. On the contrary, any number of storage applications 210 can be communicably coupled to the file provider daemon 116. Moreover, while not illustrated in FIG. 2A, it should be understood that each storage application 210 can be communicably coupled to one or more storage services or storage devices.

The following discussions of FIGS. 2B-2E illustrate a method that enables the computing device 102 to securely exchange data with untrusted entities—i.e., the storage applications 210. In an example scenario, the computing device 102 receives an initial service request such as a request to read/write from/to an untrusted entity. In this example scenario, the request to read or write can originate from the application 110 executing on the computing device 102. In response, the computing device 102 fulfills the initial service request by sending the request to read/write to the buffer cache 204. In some embodiments, the initial service request can reach the buffer cache 204 after being processed by the virtual file system 202. The first step of FIG. 2B begins with the buffer cache 204 receiving the initial service request. Consider, for the purpose of this example, that the initial service request is a read request, where the application 110 is requesting to read data stored by the storage application 210-1, which is an untrusted entity.

Figure 2B:
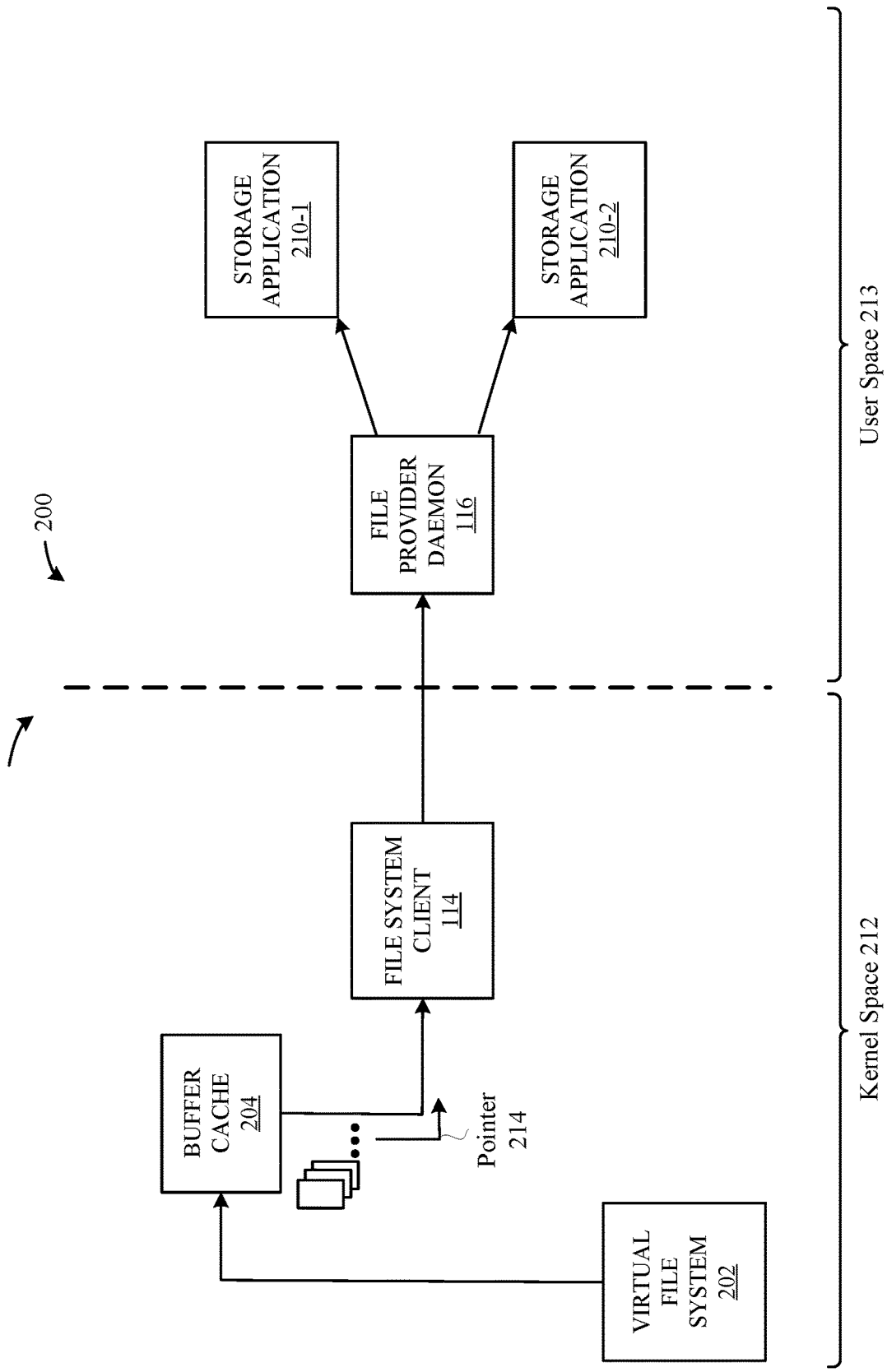

According to some embodiments, and as shown in FIG. 2B, a first step can involve the buffer cache 204 initially attempting to satisfy the read request by checking whether any of the requested data is stored in the buffer cache 204. Consider, additionally and for the purpose of this example, that the requested data is not stored in the buffer cache 204. In this example, upon determining that the requested data is not stored in the buffer cache 204, the buffer cache 204 can prepare to fetch the data from some other location by way of the storage application 210-1. In preparation for receiving the requested data from the storage application 210-1, the buffer cache 204 can allocate pages in the storage device 120, and transmit one or more pointers referencing the pages in the storage device 120 to the file system client 114. For example, the buffer cache 204 can transmit the pointer 214 to the file system client 114, where the pointer 214 references the pages in the storage device 120 (also referred to as "pages in storage" herein). Although a single pointer 214 is used in this example, it is not meant to be limiting. The reference to the pages in the storage device 120 can include a single pointer, or an array of pointers.

Figure 2C:
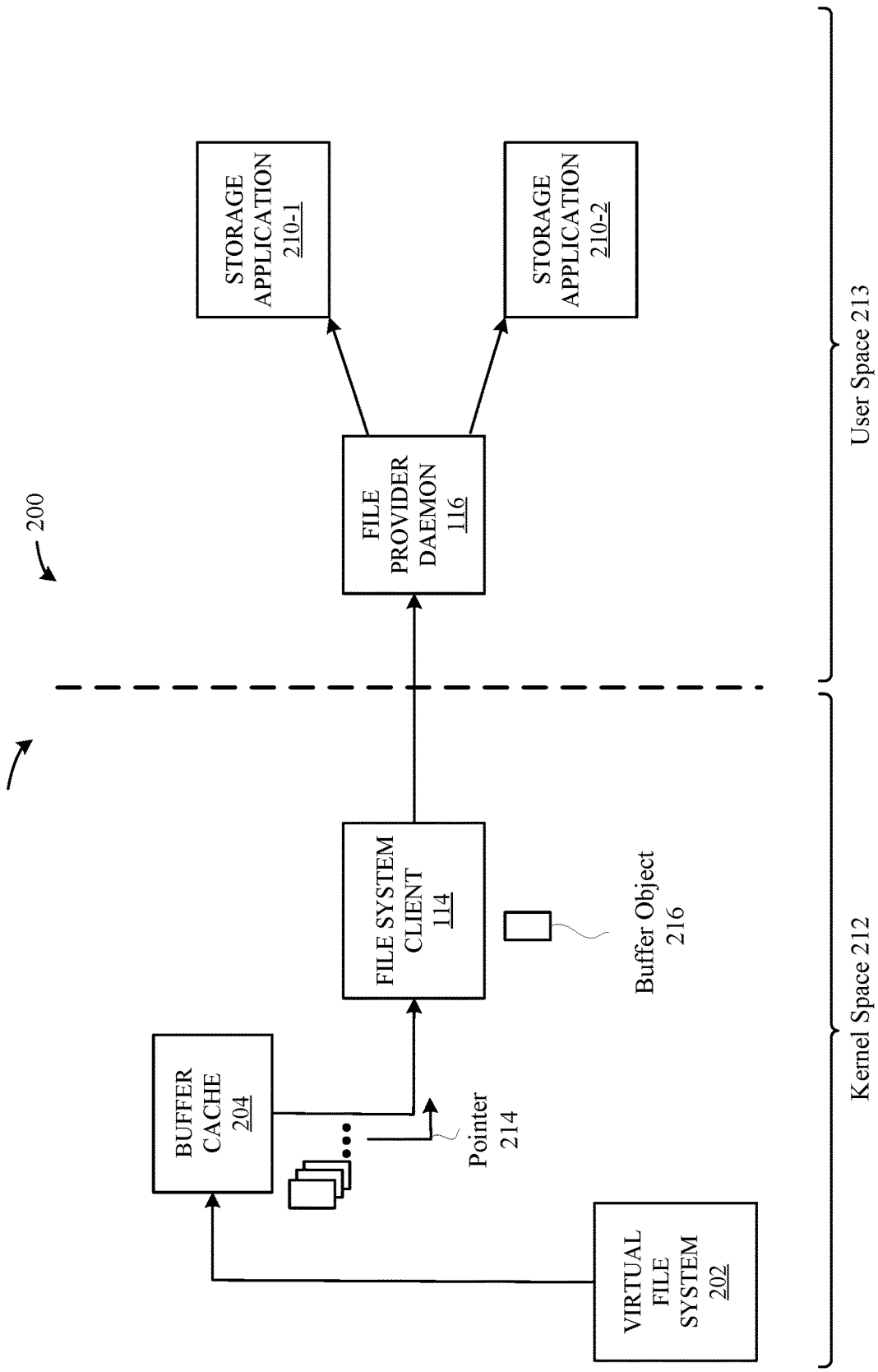

Next, at step 2 of FIG. 2C, the file system client 114 can create a buffer object such as buffer object 216 that provides access to the pages in storage referenced by the pointer 214. According to some embodiments, the buffer object 216 is mutable—and, as described in greater detail herein—the buffer object 216 is securely shareable amongst various processes that include untrusted entities. In various embodiments, the buffer object 216 can be configured such that access to the buffer object 216 must be shared with a process, without which the process cannot access the buffer object 216 and in effect the pages in storage that are referenced by the pointer 214.

Figure 2D:
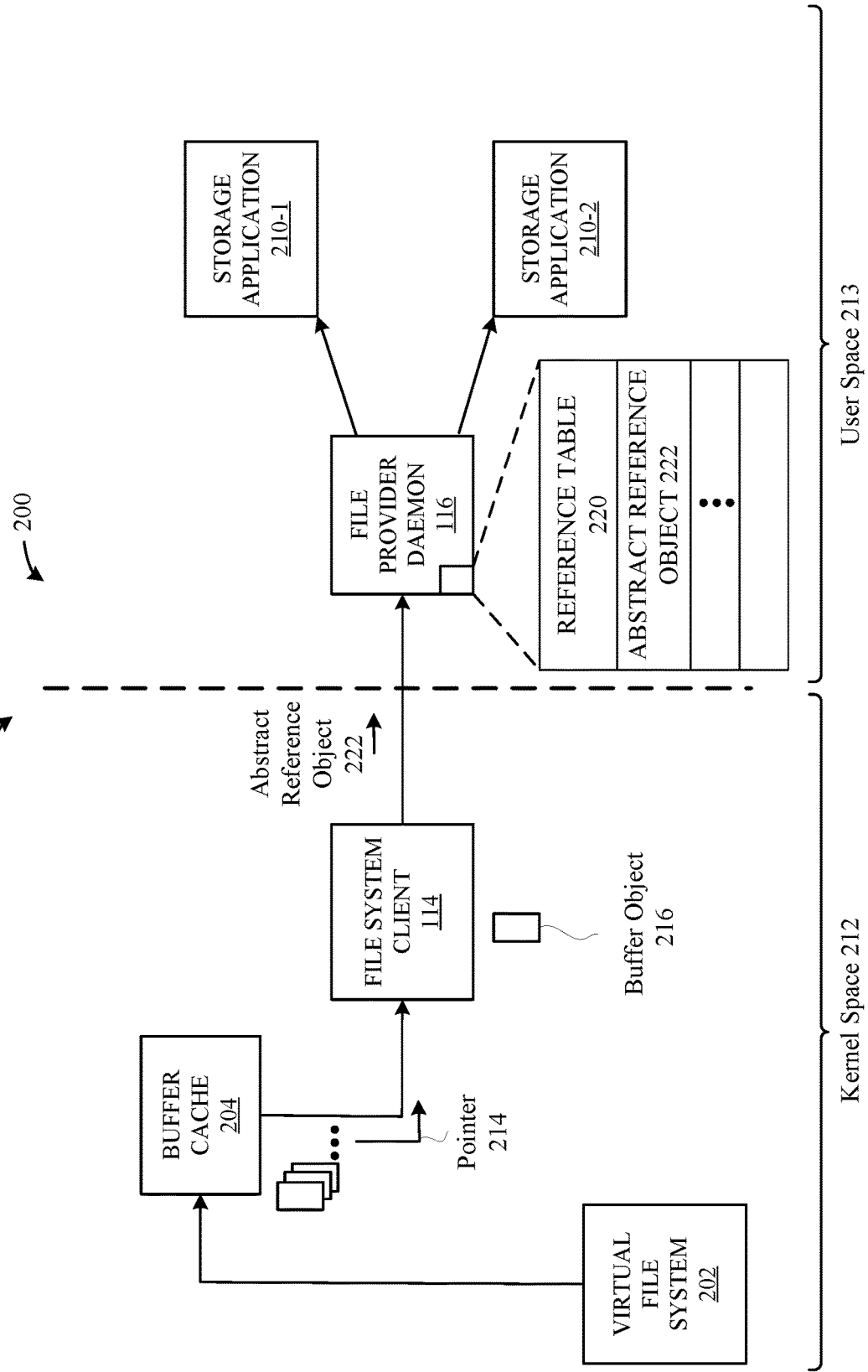

Next, at step 3 of FIG. 2D, the file system client 114 creates a service request that includes an abstract reference object 222. In accordance with some embodiments, the abstract reference object 222 is an abstract reference object that can be mapped to the buffer object 216 that provides access to the pages in storage that are referenced by the pointer 214. As will become clearer herein—the value of the abstract reference object 222 can change each time the service request hops between processes. For the purpose of this example, consider that the file system client 114 creates the abstract reference object 222, having a value "N".

In one example, the buffer object 216 is initialized by associating the value of the abstract reference object 222 with the buffer object 216. According to some embodiments, a respective process is provided access to the buffer object 216, by inserting the abstract reference object 222, associated with the buffer object 216, into a table located within the respective process. In some embodiments, the abstract reference object 222 is inserted into a table which is private to the respective process. As shown in FIG. 2D, the file system client 114 can insert the abstract reference object 222 into a reference table 220 located within the file provider daemon 116. The reference table 220 is private to the file provider daemon 116. In some examples, the reference table 220 is located within a kernel space specific to the file provider daemon 116. Without the existence of the abstract reference object 222 in the reference table 220, the file provider daemon 116 cannot access or map to the buffer object 216 and associated pages in storage, referenced by the pointer 214.

It is noted that the foregoing example in which access to the buffer object 216 is shared by inserting an abstract reference object in a private table of a respective process is not meant to be a limiting example. On the contrary, other or additional means of privately sharing access to the buffer object 216 can be implemented. In some embodiments, an inter-process communication system can have built in mechanisms for sharing the buffer object 216 in a secure manner. Furthermore, although the example discusses the creation and insertion of a single abstract reference object in the reference table 220, any number of abstract reference objects may be stored in the reference table 220. Each abstract reference object can be associated with a respective shared mutable buffer object. Thus, the file provider daemon 116 can be provided with access to multiple shared mutable buffer objects, which the file provider daemon 116 can, in turn, share with various processes including untrusted entities.

Figure 2E:
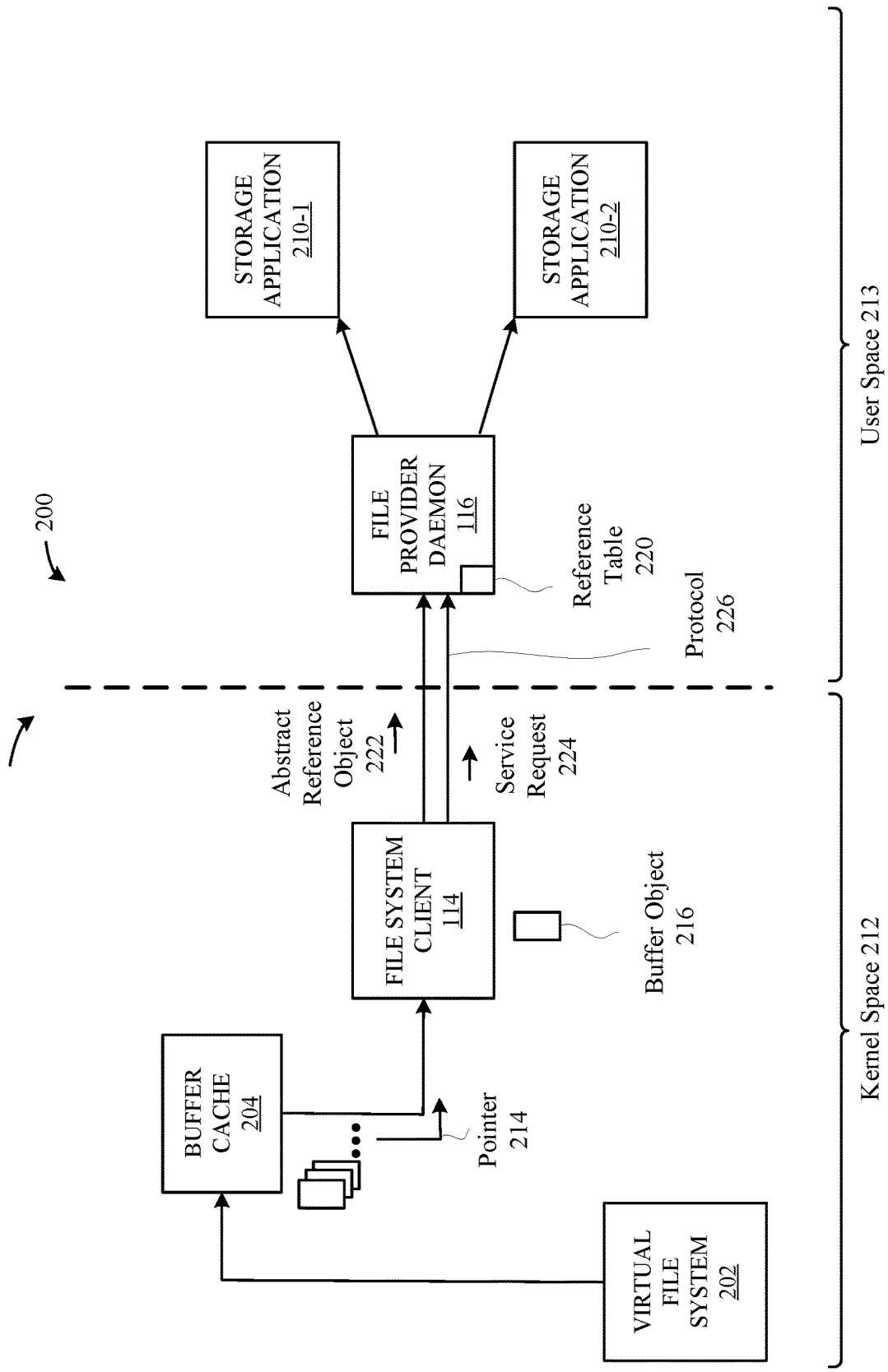

Next, at step 4 of FIG. 2E, the file system client 114 can create a service request 224 that references the abstract reference object 222—e.g., the service request 224 includes the value "N"—and transmit the service request 224 to the file provider daemon 116. According to some embodiments, the service request 224 can be transmitted using a protocol 226 that can represent a messaging protocol (e.g., inter-process communication system). Thus, instead of transmitting a read request that includes information about a channel over which data can be transmitted, the service request 224 can include information associated with the abstract reference object 222 and the type of request (e.g., a read, a write, and the like). In particular, in the example where the service request 224 is a read request, the service request 224 can identify that it is a read request, indicate an amount of storage that has been offset, and indicate that the storage is located at the value of the abstract reference object 222 (e.g., "N"). In an example where the service request 224 is a write request, the service request 224 can identify that it is a write request, and indicate the storage is located at the value of the abstract reference object 222 (e.g., located at index "N").

The steps described in FIGS. 2C-2E (i.e., steps 2-4) can be performed in any order without departing from the scope of this disclosure. For example, as between the creation of the buffer object 216 and the abstract reference object 222, the order in which either is created is not meant to be limiting. That is, the abstract reference object 222 can be created prior to, subsequent to, or simultaneous to the creation of the buffer object 216. Furthermore, as between the creation of the service request 224 and the insertion of the abstract reference object 222, the order in which either is completed is not meant to be limiting. For example, the service request 224 can be created initially, and the abstract reference object 222 can be inserted into the reference table 220 subsequently. Thus, the order in which the steps 2-4 is completed can take any form without departing from the scope of this disclosure.

Furthermore, in some embodiments, underlying code (e.g., an underlying framework) executing in the file system client 114 can initially create the abstract reference object 222 and insert the abstract reference object 222 in the reference table 220. Subsequently, the underlying code can detect transmittal of the service request 224 that includes the abstract reference object 222, and in response, create the buffer object 216 to which the abstract reference object 222 is associated with. Thus, the buffer object 216 can be initialized when the underlying code associates the value of the abstract reference object 222 with the buffer object 216.

Figure 2F:
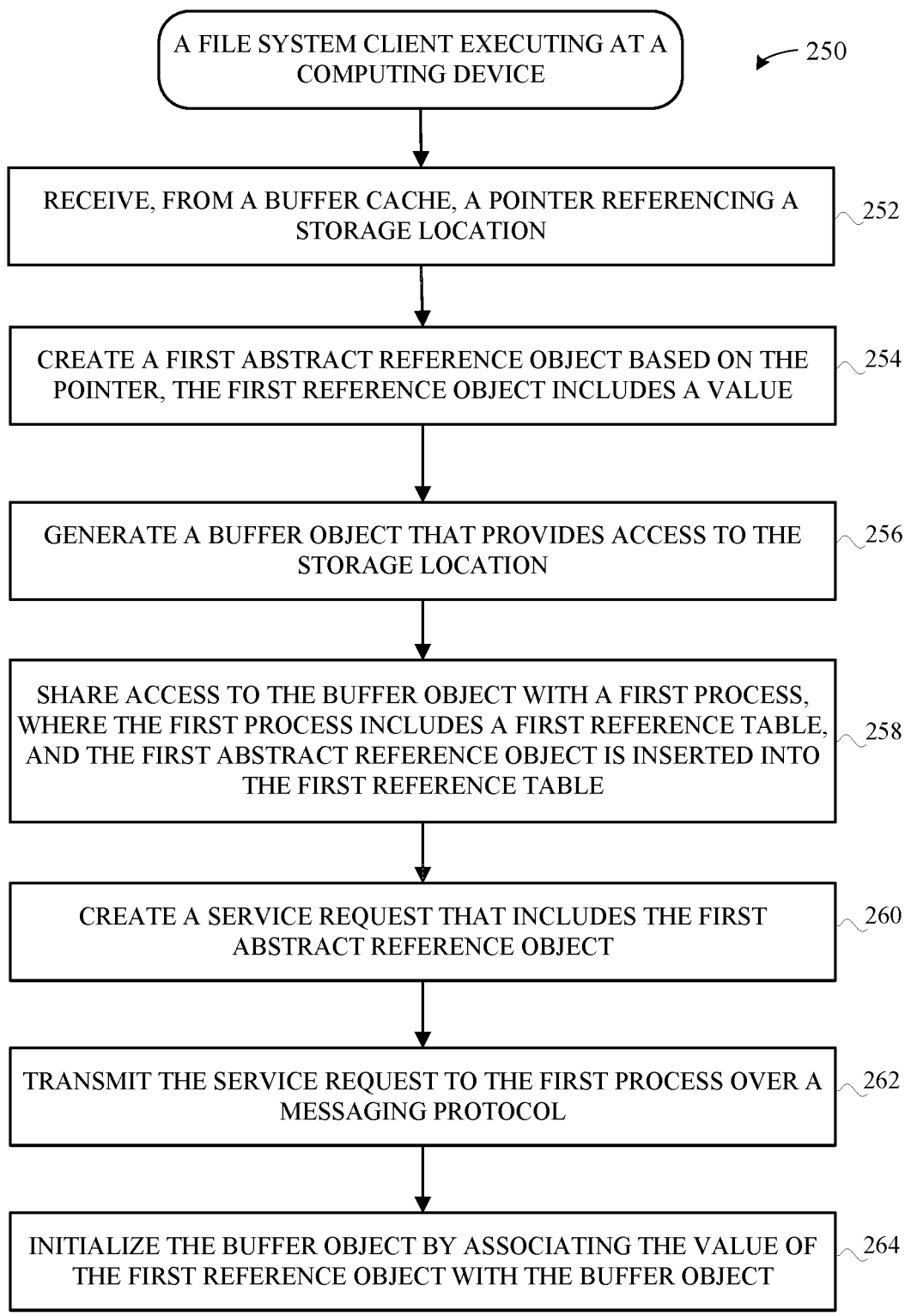

Accordingly, FIGS. 2A-2E illustrate an example breakdown of the manner in which the file system client 114 creates and provides the buffer object 216 to the file provider daemon 116. The file system client 114 creates an abstract reference object associated with the buffer object 216 and transmits a service request including the abstract reference object. The file system client 114 can provide access to the buffer object 216 by placing the abstract reference object inside a table that is private to the file provider daemon 116. Additional high-level details will now be provided in conjunction with FIG. 2F, which illustrates a method 250 that can be implemented to carry out the methods described above in conjunction with FIGS. 2A-2E. As shown in FIG. 2F, the method 250 begins at step 252, the file system client 114 executing at the computing device 102 receives, from a buffer cache, a pointer referencing a storage location (e.g., as described above in conjunction with FIG. 2B).

At step 254, the file system client 114 executing at the computing device 102 creates a first abstract reference object based on the pointer, where the first abstract reference object includes a value (e.g., as described above in conjunction with FIG. 2D). For example, the file system client 114 creates the abstract reference object 222 with value "N". At step 256, the file system client 114 executing at the computing device 102, generates a buffer object that provides access to the storage location (e.g., as described above in conjunction with FIG. 2C). For example, the file system client 114 creates the buffer object 216 that provides access to the pages in storage, referenced by the pointer 214.

Next, at step 258, the file system client 114 executing at the computing device 102, shares access to the buffer object with a first process. The first process can include a first reference table, and the file system client 114 inserts the first abstract reference object into the first reference table (e.g., as described above in conjunction with FIG. 2D). For example, the file system client 114 inserts the abstract reference object 222 into the reference table 220.

At step 260, the file system client 114 executing at the computing device 102, creates a service request that includes the first abstract reference object and at step 262, the file system client 114 transmits the service request to the first process over a messaging protocol (e.g., as described above in conjunction with FIG. 2E). For example, the file system client 114 transmits the service request 224 over a messaging channel using the protocol 226 to the file provider daemon 116. Next, at step 264, the file system client 114 executing at the computing device 102, initializes the buffer object by associating the value of the first abstract reference object with the buffer object.

Accordingly, FIGS. 2A-2F illustrate a manner in which the file system client 114 can provide access to pages in storage with a process executing in the user space 213—i.e., the file provider daemon 116. The file system client 114 creates a buffer object and provides the buffer object to the file provider daemon 116, where the buffer object is further shareable amongst processes in a controlled manner. By using at least the method and architecture described thus far, the computing device 102 enhances the overall user experience by providing a device, such as a smartphone, that maintains robust security and a level of distrust of untrusted entities, while also providing access to pages in storage to a process executing in the user space 213. Next, a method is described in which the file provider daemon 116 provides access to the buffer object to other processes including untrusted entities. As the service request 224 hops from one process to another, access to the buffer object 216 is also passed along.

Figure 3A:
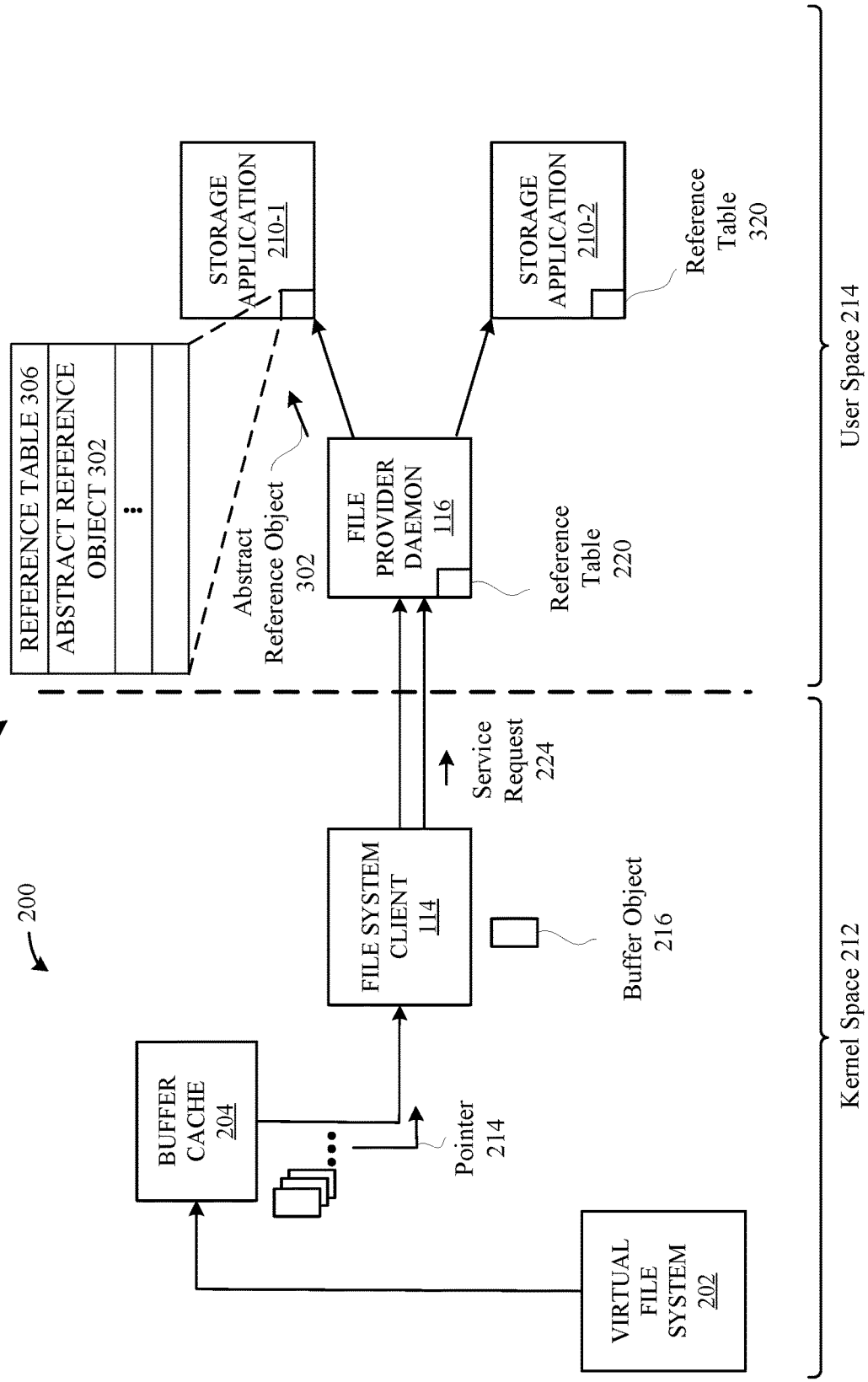
FIGS. 3A-3D illustrate conceptual and method diagrams in which the file provider daemon provides access to storage with a storage application, according to some embodiments.

In particular, FIGS. 3A-3D illustrate conceptual and method diagrams that demonstrate a manner in which the file provider daemon 116 shares access to the shared mutable buffer with untrusted entities. FIG. 3A is a continuation of the example method discussed in FIGS. 2A-2E. At step 5 of FIG. 3A, upon receiving the service request 224, the file provider daemon 116 can determine a destination of the service request and share access to the shared mutable buffer by inserting a different abstract reference object in a reference table of a destination process.

For example, the file provider daemon 116 can parse the service request 224 to determine that a destination of the service request 224 is the storage application 210-1. As described previously, each of the storage applications 210 can be a process or service associated with a storage device (e.g., a solid-state drive) or storage service (e.g., a cloud service). The storage applications 210-1 and 210-2 can function as an interface between various applications and the storage device or storage service, where the storage application 210-1 can retrieve or store files within a respective storage device or the storage service. Similar to the file system client 114, the file provider daemon 116 can share access to the buffer object 216 by inserting an abstract reference object associated with the buffer object 216 in a table that is private to the destination process (e.g., the storage application 210-1). In the example shown in FIG. 3A, the storage application 210-1 includes the private reference table 306, while the storage application 210-2 includes the private reference table 320.

As shown in step 5 of FIG. 3A, the file provider daemon 116 transmits the abstract reference object 302 that has a respective value. The value of the abstract reference object 302 can represent an abstract pointer to the buffer object 216. Consider for purposes of this example, that the value of the reference object 302 is "M". The file provider daemon 116 can transmit the abstract reference object 302 that has a value "M" and insert the abstract reference object 302 inside the reference table 306. In various embodiments, the buffer object 216 is initialized by associating the value of the abstract reference object 302 with the buffer object 216. Recall, that the value of the abstract reference object 222 (discussed in FIG. 2D) is "N". Further, note that both the abstract reference objects 222 and 302 are associated with the same buffer object 216. Additionally, each of the abstract reference objects 222 and 302 are private to respective processes. Each time the abstract reference object is inserted into a different reference table, the value of the abstract reference object is changed to a different abstract reference while also referencing the buffer object 216.

Such an implementation incorporates a level of security to the methods directed to providing access to the buffer object 216 to various processes. Because each abstract reference object that is associated with the buffer object 216 is unique and private to a respective process, the chances of unauthorized access to the buffer object 216 are reduced. Additionally, information regarding which process has been given access to a respective buffer object is kept secure. In order to map to the pages in storage, referenced by the pointer 214, a process must have an entry within its private table that contains an abstract reference object associated with the buffer object 216.

Figure 3B:
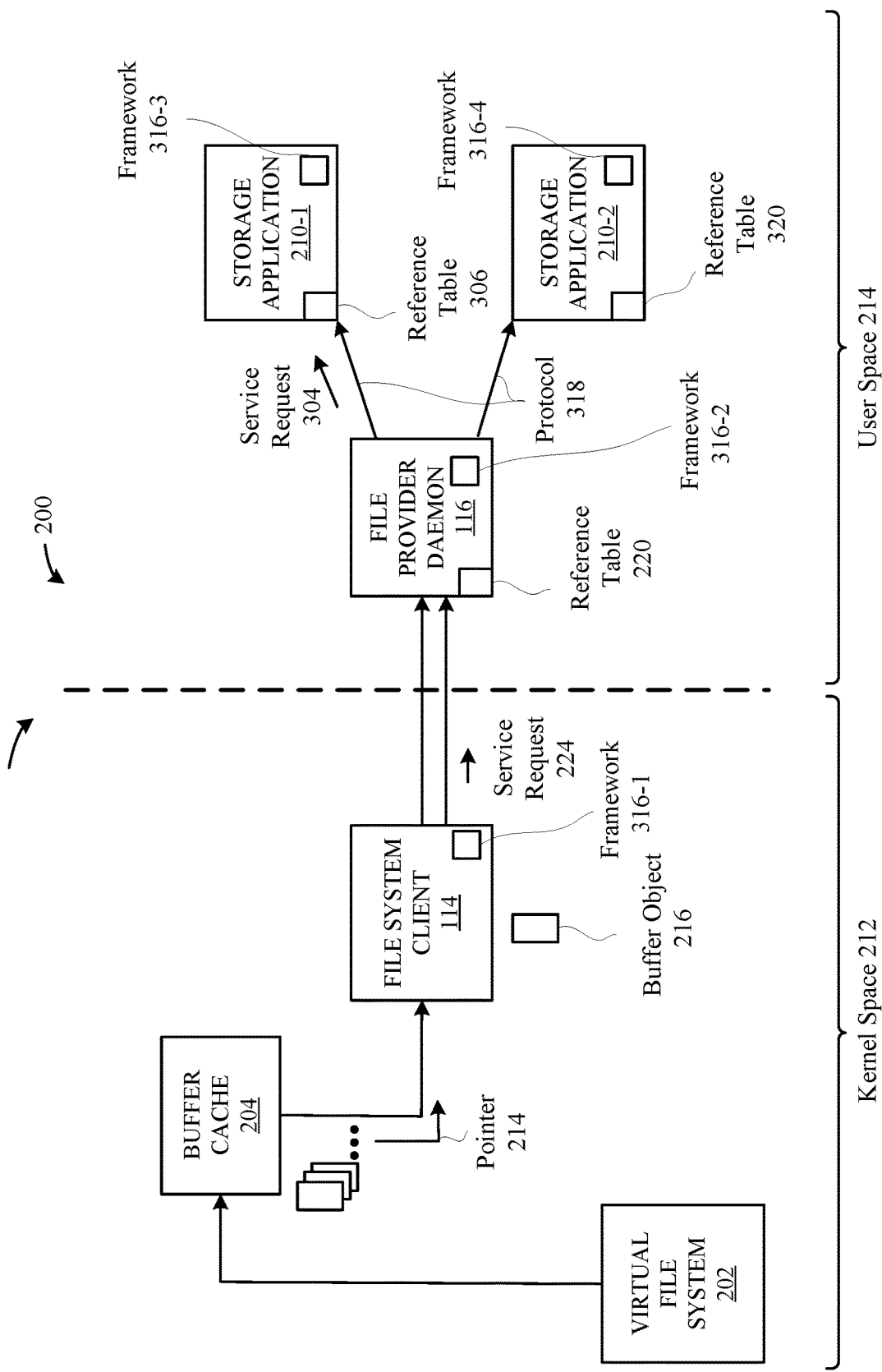

Next, at step 6 of FIG. 3B, similar to how the file system client 114 transmits a service request (e.g., FIG. 2E), the file provider daemon 116 can create and transmit a service request 304 that includes the value of the abstract reference object 302. In an example where the service request 304 is a read request, the service request 304 can identify that it is a read request, indicate an amount of storage that has been offset, and indicate that storage is located at the value of the abstract reference object 302 (e.g., "M"). In an example where the service request 304 is a write request, the service request 304 can identify that it is a write request, and indicate the storage is located at the value of the abstract reference object 302 (e.g., "M").

According to some embodiments, the service request 304 can be transmitted using a messaging protocol 318 (e.g., an inter-process communication system, a messaging protocol implemented across an abstraction boundary for third party protocols, and the like). Thus, instead of transmitting a read request that includes information about a channel over which data should be transmitted, similar to the service request 224, the service request 304 can include information associated with the buffer object 216 (e.g., abstract reference object 302) and the type of request (e.g., a read, a write, and the like).

It is noted that as between the creation of the service request 304, transmission of the service request 304, and the insertion of the abstract reference object 302 in the reference table 306, the order in which these steps is completed is not meant to be limiting. For example, the service request 304 can be created initially, and the abstract reference object 302 can be inserted into the reference table 306 subsequently. Further, the buffer object 216 can be initialized when the file provider daemon 116 associates the value of the abstract reference object 302 with the buffer object 216. Thus, the steps described in FIGS. 3A-3B (i.e., steps 5 and 6) can be performed in any order without departing from the scope of this disclosure.

Still referring to FIG. 3B, according to some embodiments, the previous references to underlying code is embodied as frameworks 316, which can be incorporated into the various processes discussed thus far. As shown, the framework 316-1 is loaded into the file system client 114, the framework 316-2 is loaded into the file provider daemon 116, the framework 316-3 is loaded into the storage application 210-1, and the framework 316-4 is loaded into the storage application 210-2. In particular, the framework 316 can include a shared mutable buffer framework that can handle sharing access to the buffer object 216 including creating a buffer object, creating an abstract reference object, preparing abstract reference objects for transport over a messaging protocol, inserting the abstract reference objects into respective reference tables, and the like. For example, the framework 316-2 can create the abstract reference object 302 and transmit the service request 304 including the abstract reference object 302. Subsequently, the framework 316-2 can insert the abstract reference object 302 in the reference table 306. In some embodiments, the framework 316-2 can detect transmittal of the service request 304 that includes the abstract reference object 302, and in response can associate the buffer object 216 with the abstract reference object 302.

Figure 3C:
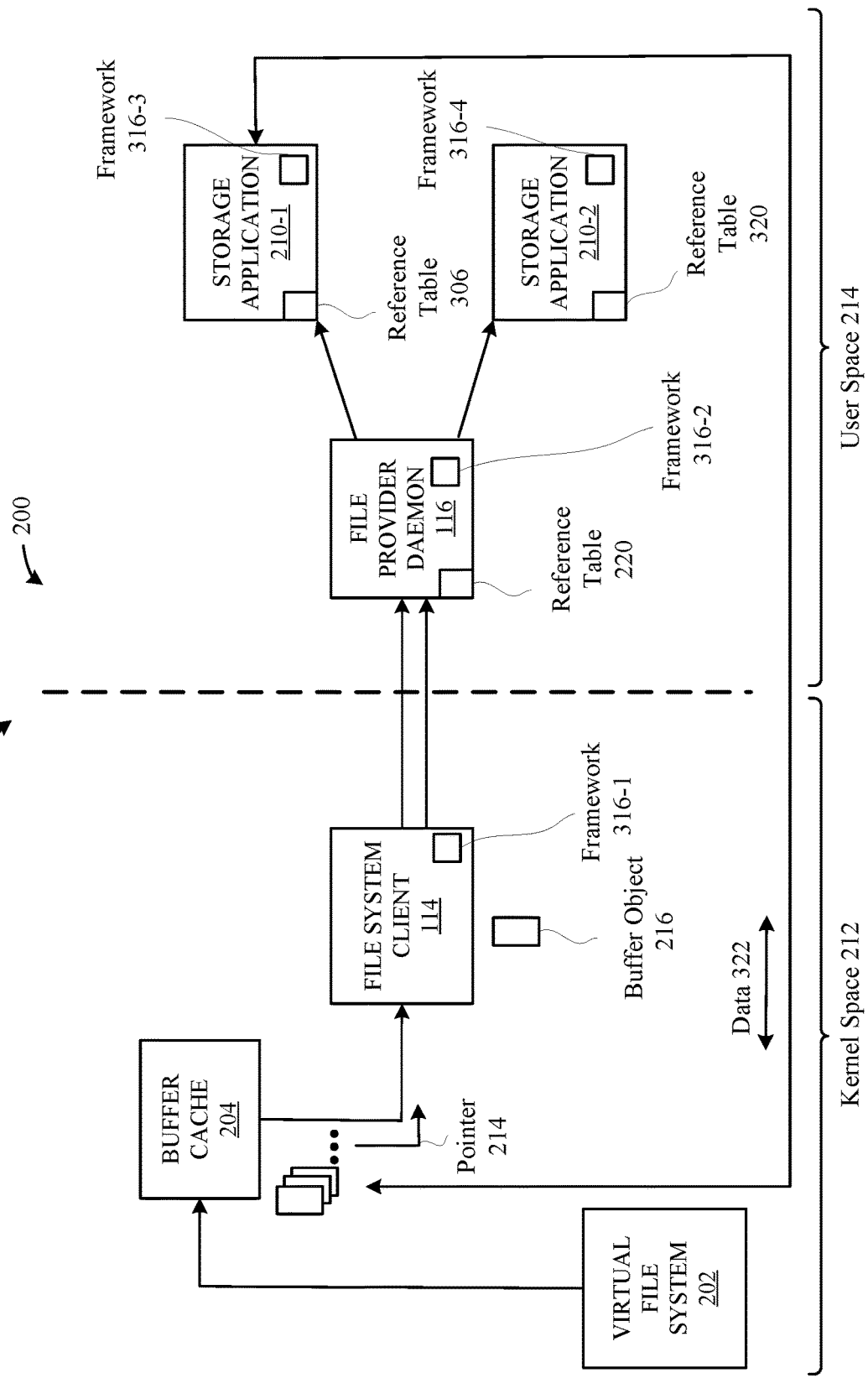

Next, at step 7 of FIG. 3C, the storage application 210-1 maps the abstract reference object 302 to the pages in storage, referenced by the pointer 214 and fulfills the service request 304 by directly transferring data 322 to or from the pages in storage, referenced by the pointer 214. As the storage application 210-1 contains the abstract reference object 302 associated with the buffer object 216, in its private reference table 306, the storage application 210-1 has permission to map to the buffer object 216 and pages in storage, referenced by the pointer 214.

A particular process is prevented from guessing the value of a particular abstract reference object that is associated with the buffer object 216, by virtue of the manner in which access is shared to the buffer object 216. According to some embodiments, if a particular process requests to map an abstract reference object, the framework 316 can check whether the abstract reference object is present in the reference table of the particular process. If the abstract reference object is not present, the process is not allowed to map the abstract reference object. For example, if the only entry in the reference table 306 includes the abstract reference object 302 with the value "M", if the storage application 210-1 attempts to map an abstract reference object with the value "S", the frameworks 316 will check the reference table 306 for the abstract reference object with the value "S". As the reference table 306 does not include the abstract reference object with the value "S", the storage application 210-1 will not be allowed to map that value. This is true, even if another different process contains the abstract reference object with the value "S", and a buffer object exists that is associated with the abstract reference object with the value "S".

Accordingly, FIGS. 3A-3C illustrate an example breakdown of the manner in which the file provider daemon 116 can provide the buffer object 216 to various other processes that include untrusted entities. As a service request hops from one process to another, access to the buffer object 216 is also passed along by way of an abstract reference object associated with the buffer object 216. The file provider daemon 116 provides access to the buffer object 216 by inserting a unique abstract reference object into a reference table of a respective process, where the reference table is private to the respective process. A process in possession of an abstract reference object associated with the buffer object is enabled to directly map to the pages in storage represented by the buffer object. In some embodiments, once the storage is mapped, a direct memory access (DMA) engine can transfer data between the process and the storage of the computing device 102.

Figure 3D:
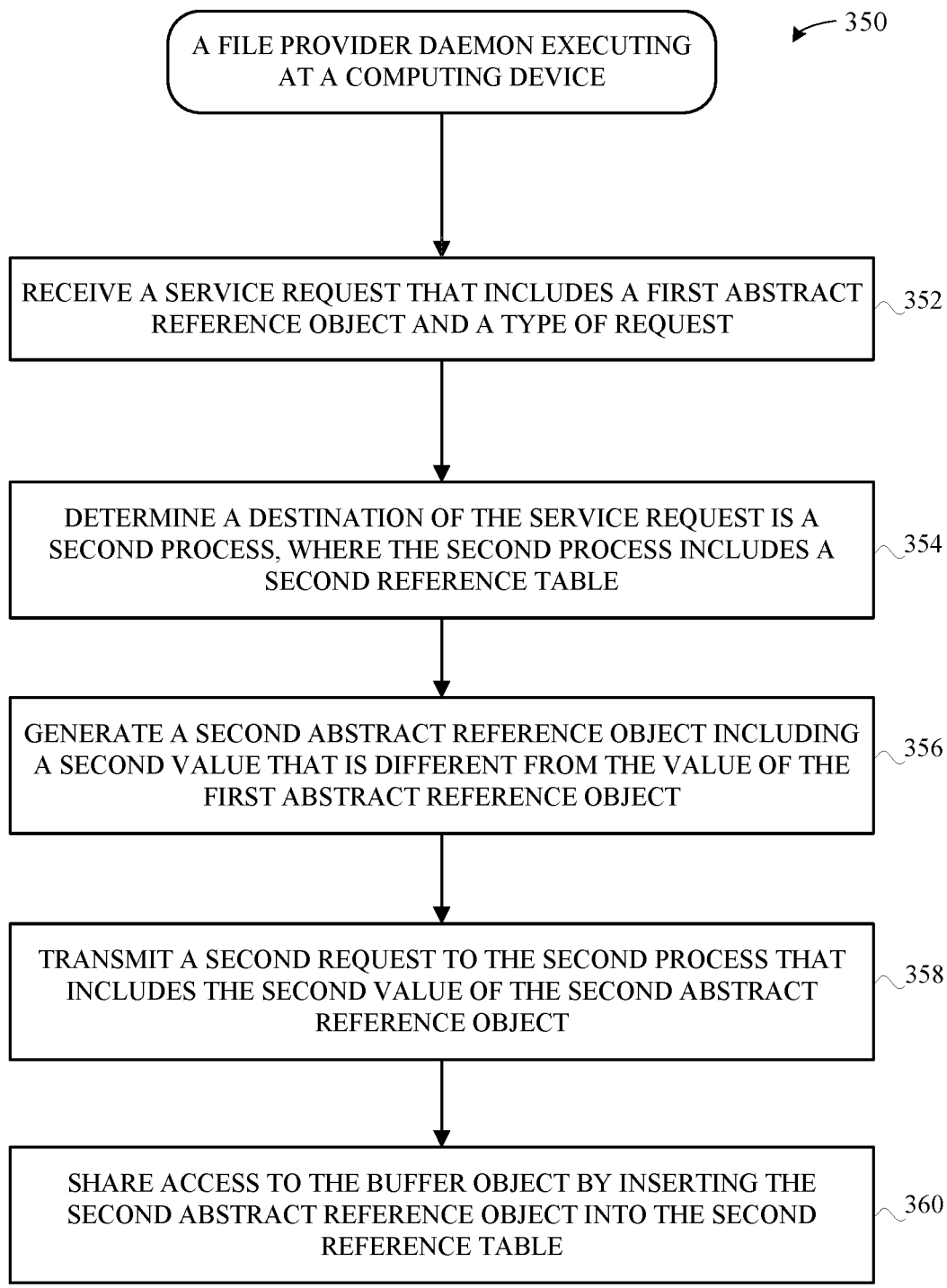

Additional high-level details will now be provided in conjunction with FIG. 3D, which illustrates a method 350 that can be implemented to carry out the methods described above in conjunction with FIGS. 3A-3C. As shown in FIG. 3D, the method 350 begins at step 352, the file provider daemon 116 executing at the computing device 102, receives a service request that includes a first abstract reference object and a type of request (e.g., as described above in conjunction with FIGS. 2E and 3A). For example, the file provider daemon 116 receives the service request 224 including the abstract reference object 222 and a type of request, where the type of request can indicate whether the service request 224 is a read or write request.

At step 354, the file provider daemon 116 executing at the computing device 102, determines a destination of the service request is a second process, where the second process includes a second reference table (e.g., as described above in conjunction with FIG. 3A). For example, the file provider daemon 116 determines the destination is storage application 210-1. At step 356, the file provider daemon 116 executing at the computing device 102, generates a second abstract reference object that includes a second value that is different from the value of the first abstract reference object.

Next, at step 358, the file provider daemon 116 transmits a second request to the second process that includes the second value of the second abstract reference object (e.g., as described above in conjunction with FIG. 3B). For example, the file provider daemon 116 can transmit the service request 304 to the storage application 210-1. At step 360, the file provider daemon 116 executing at the computing device 102, shares access to the buffer object by inserting the second abstract reference object into the second reference table (e.g., as described above in conjunction with FIG. 3A). For example, the file provider daemon 116 inserts the abstract reference object 302 into the reference table 306.

Accordingly, FIGS. 3A-3D illustrate a manner in which the file provider daemon 116 can provide the buffer object 216 to various other processes that include untrusted entities. As a service request hops from one process to another, access to the buffer object 216 is also passed along by way of an abstract reference object to the buffer object 216. Similar to the manner in which the file system client 114 can share a buffer object, the file provider daemon 116 provides access to a buffer object by inserting a unique abstract reference object into a table that is private to a process. A process that has permission to access the buffer object can directly read or write into the storage.

By using at least the method and architecture described herein, the computing device 102 enables an untrusted entity to directly read or write data into a storage of the computing device using a zero-copy method of transferring data between the computing device 102 and an untrusted entity (e.g., untrusted software associated with a storage device or service). That is, data can be transferred without implementing a protocol that includes copying the data through several hops before the data is stored locally at the computing device. By using at least the method and architecture described, the computing device 102 enhances the overall user experience by providing a device, such as a smartphone, that maintains robust security and a level of distrust of untrusted entities, while also allowing the user to access data and files that may be stored by the untrusted entities.

Figure 4:
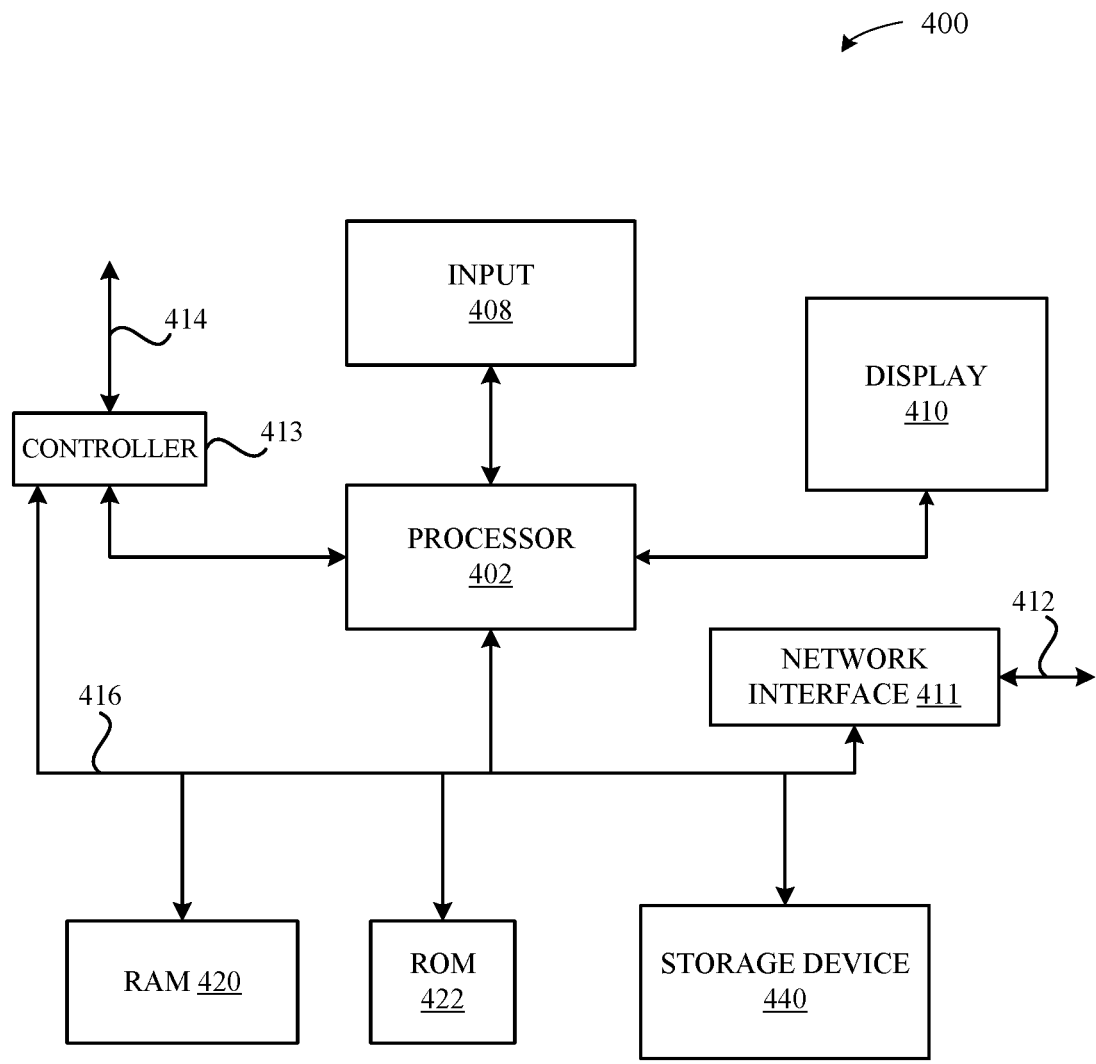
FIG. 4 illustrates a detailed view of a computing device that can represent the computing device of FIG. 1 used to implement the various techniques described herein, according to some embodiments.

FIG. 4 illustrates a detailed view of a computing device 400 that can be used to implement the various components described herein, according to some embodiments. In particular, the detailed view illustrates various components that can be included in the computing device 102 illustrated in FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives), and includes a storage management module that manages one or more partitions within the storage device 440. In some embodiments, storage device 440 can include flash memory, semiconductor (solid-state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of processes and applications executing on the computing device 102, including the application 110, the file view controller 112, the file system client 114, and the file provider daemon 116.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

What is claimed is:

1. A method for enabling data transfer between an untrusted entity and a storage device accessible to a computing device, the method comprising, at the computing device:

receiving a pointer that references a storage location on the storage device, wherein the pointer is output by a buffer cache implemented in a kernel space of the computing device;

in response to receiving the pointer:

generating, based on the pointer, an abstract reference object, and generating a buffer object that provides access to the storage location;
sharing access to the buffer object with a first process implemented in a user space of the computing device, wherein:
the first process includes a first reference table, and
the abstract reference object is inserted into the first reference table;
transmitting a service request to the first process over a messaging protocol, wherein the service request includes the abstract reference object; and
initializing the buffer object by associating the abstract reference object with the buffer object.

2. The method of claim 1, wherein sharing access to the buffer object further comprises:
providing a permission to access the buffer object that enables the first process to directly access the storage location by way of a direct memory access engine.

3. The method of claim 2, further comprising:
determining a destination of the service request is a second process, wherein the second process includes a second reference table;
generating a second abstract reference object that is different from the abstract reference object;
transmitting a second request to the second process that includes the second abstract reference object; and
sharing access to the buffer object by inserting the second abstract reference object into the second reference table.

4. The method of claim 3, further comprising, in response to transmitting the second request, receiving data from the destination, wherein:
the data is stored directly into the storage location by the direct memory access engine, and
the storage location is mapped by the second process based on the second abstract reference object.

5. The method of claim 3, further comprising:
receiving the second request comprising a read request;
mapping to the storage location based on the second abstract reference object;
transferring data directly from the destination to the storage location by way of the direct memory access engine; and
transmitting an indication that the second request is fulfilled.

6. The method of claim 3, further comprising:
receiving the second request comprising a write request;
mapping to the storage location based on the second abstract reference object;
transferring data directly from the storage location to the destination by way of the direct memory access engine; and
transmitting an indication that the second request is fulfilled.

7. The method of claim 3, wherein:
the abstract reference object is private to the first process,
the second abstract reference object is private to the second process, and
the second process is associated with at least one selected from the group consisting of: a storage service and a second storage device.

8. The method of claim 1, wherein sharing access to the buffer object comprises sharing by way of an inter-process communication protocol.

9. A computing device configured to enable a data transfer between an untrusted entity and a storage device accessible to the computing device, the computing device comprising:
a processor; and
a memory configured to store instructions that, when executed by the processor, cause the processor to carry out steps that include:
receiving a pointer that references a storage location on the storage device, wherein the pointer is output by a buffer cache implemented in a kernel space of the computing device;
in response to receiving the pointer:
generating, based on the pointer, an abstract reference object, and
generating a buffer object that provides access to the storage location;
sharing access to the buffer object with a first process implemented in a user space of the computing device, wherein:
the first process includes a first reference table, and
the abstract reference object is inserted into the first reference table;
transmitting a service request to the first process over a messaging protocol, wherein the service request includes the abstract reference object; and
initializing the buffer object by associating the abstract reference object with the buffer object.

10. The computing device of claim 9, wherein the steps further include:
providing a permission to access the buffer object that enables the first process to directly access the storage location by way of a direct memory access engine.

11. The computing device of claim 10, wherein the instructions further cause the processor to:
determine a destination of the service request is a second process, wherein the second process includes a second reference table;
generate a second abstract reference object that is different from the abstract reference object;
transmit a second request to the second process that includes the second abstract reference object; and
share access to the buffer object by inserting the second abstract reference object into the second reference table.

12. The computing device of claim 11, wherein the instructions further cause the processor to, in response to transmitting the second request, receive data from the destination, wherein:
the data is stored directly into the storage location by the direct memory access engine, and
the storage location is mapped by the second process based on the second abstract reference object.

13. The computing device of claim 11, wherein the instructions further cause the processor to:
receive the second request comprising a read request;
map to the storage location based on the second abstract reference object;
transfer data directly from the destination to the storage location by way of the direct memory access engine; and
transmit an indication that the second request is fulfilled.

14. The computing device of claim 11, wherein:
the first process is a file system client, and
the second process is associated with at least one selected from the group consisting of: a storage service and the storage device.

15. The computing device of claim 11, wherein the instructions further cause the processor to:
receive the second request comprising a write request;

map to the storage location based on the second abstract reference object;

transfer data directly from the storage location to the destination by way of the direct memory access engine; and transmit an indication that the second request is fulfilled.

16. A non-transitory computer readable storage medium configured to store instructions that, when executed by a processor in a computing device, cause the processor to enable a data transfer between an untrusted entity and a storage device accessible to the computing device, by carrying out steps that include:

receiving a pointer referencing a storage location on the storage device, wherein the pointer is output by a buffer cache implemented in a kernel space of the computing device;

in response to receiving the pointer:

generating, based on the pointer, an abstract reference object, and generating a buffer object that provides access to the storage location;

sharing access to the buffer object with a first process implemented in a user space of the computing device, wherein:

the first process includes a first reference table, and the abstract reference object is inserted into the first reference table;

transmitting a service request to the first process over a messaging protocol, wherein the service request includes the abstract reference object; and initializing the buffer object by associating the abstract reference object with the buffer object.

17. The non-transitory computer readable storage medium of claim 16, wherein the instructions further cause the processor to:

determine a destination of the service request is a second process, wherein the second process includes a second reference table;

generate a second abstract reference object that is different from the abstract reference object;

transmit a second request to the second process that includes the second abstract reference object; and share access to the buffer object by inserting the second abstract reference object into the second reference table.

18. The non-transitory computer readable storage medium of claim 17, wherein when the instructions cause the processor to share access to the buffer object by inserting the second abstract reference object, the instructions further cause the processor to provide a permission to access the buffer object that enables the second process to directly access the storage location by way of a direct memory access engine.

19. The non-transitory computer readable storage medium of claim 18, wherein the instructions further cause the processor to, in response to transmitting the second request, receive data from the destination, wherein:

the data is stored directly into the storage location by the direct memory access engine, and the storage location is mapped by the second process based on the second abstract reference object.

20. The non-transitory computer readable storage medium of claim 18, wherein the instructions further cause the processor to:

receive the second request that comprises a read request;

map to the storage location based on the second abstract reference object;

transfer data directly from the destination to the storage location by way of the direct memory access engine; and transmit an indication that the second request is fulfilled.

* * * * *